US011006783B1

(12) United States Patent
Morales

(10) Patent No.: US 11,006,783 B1
(45) Date of Patent: May 18, 2021

(54) TOASTER ACCESSORY

(71) Applicant: Orlando Morales, Menifee, CA (US)

(72) Inventor: Orlando Morales, Menifee, CA (US)

( * ) Notice: Subject to any disclaimer, the term of this patent is extended or adjusted under 35 U.S.C. 154(b) by 300 days.

(21) Appl. No.: 16/239,717

(22) Filed: Jan. 4, 2019

(51) Int. Cl.
*A47J 37/06* (2006.01)
*A47J 37/08* (2006.01)

(52) U.S. Cl.
CPC .................. *A47J 37/0885* (2013.01)

(58) Field of Classification Search
CPC ................ A47J 37/0623; A47J 37/0629; A47J 37/0688; A47J 37/0694; A47J 37/0718; A47J 37/0814; A47J 37/0857; A47J 37/0864; A47J 37/0871; A47J 37/0885
USPC ......... 99/385, 392–394, 422, 423, 427, 441, 99/448
See application file for complete search history.

(56) References Cited

U.S. PATENT DOCUMENTS

| 4,972,767 | A | 11/1990 | Russell |
| 8,240,246 | B2 | 8/2012 | Davis |
| 2009/0293737 | A1* | 12/2009 | Davis .................. A47J 37/0885 99/394 |

* cited by examiner

Primary Examiner — Hung D Nguyen
(74) Attorney, Agent, or Firm — Sanchelima & Associates, P.A.; Christian Sanchelima; Alexander Rodriguez

(57) ABSTRACT

A toaster accessory for cooking hot dogs, sausages or the like is disclosed. The toaster accessory comprises a base member, one or more rectangular box like frames, one or more hollow cages and a handle. The rectangular box like frame is disposed below the base member comprises multiple sidewalls with a rectangular opening. One or more hollow cages is disposed within each rectangular box like frame. Further, the rectangular box like frame is sized to horizontally support the hollow cages. The hollow cage comprises open ends to receive the hotdog therein. The handle is disposed above the frame made of a heat resistant material. Advantageously, the present invention eases the task of cooking hot dogs by saving time and effort of the user.

10 Claims, 2 Drawing Sheets

TOASTER ACCESSORY

II. BACKGROUND OF THE INVENTION

1. Field of the Invention

Figure 1:
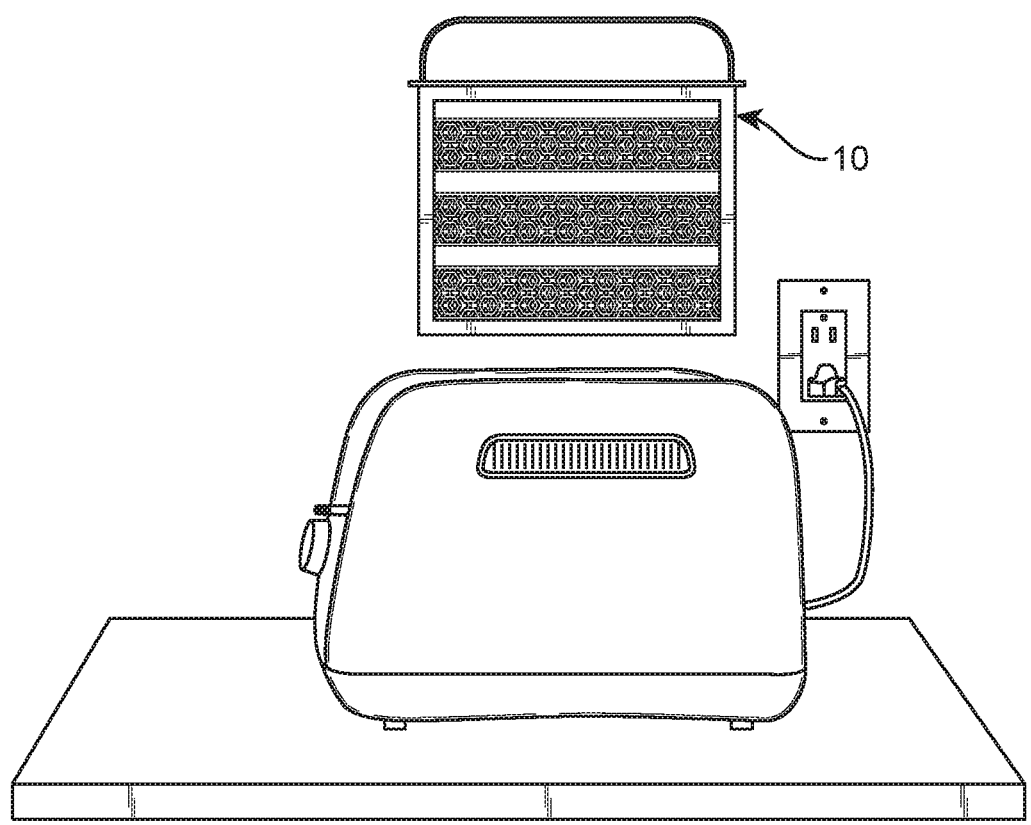

The present disclosure relates to a toaster accessory. More specifically, the present disclosure relates to a toaster accessory for cooking hot dogs, sausages or the like.

2. Description of the Related Art

Electric toaster ovens are well-known kitchen appliances that are mainly used to toast breads. In use, pieces of toasts put into toast slots of the spring-loaded tray, which is pressed downward by a handle, and an attraction element attracts the spring-loaded tray to start toasting. After cooking, the toast pop-up from the toast slot. This simplified method of cooking is very convenient for people during emergency, and with less cooking knowledge.

However, this merchandise could not be able to process other kinds of food. For instance, people like to eat their breakfast with fried egg, fried ham, a cup of hot coffee, or a cup of hot milk. Those additional items are necessitated to implement other cooking utensils, for example, pan, electric cup, etc. As a result, such a simple breakfast may require a lot of home appliances. Further, these food could not be efficiently prepared using existing toaster and lacks to provide a solution to process different kinds of foods in the existing toaster.

Several devices have been designed in the past. None of them, however, include a toaster accessory that is capable of addressing the foregoing discussed issues.

Applicant believes that a related reference corresponds to U.S. Pat. No. 8,240,246 filed by Rick Davis describes a removable toaster basket with handle. The Rick reference teaches a removable toaster basket assembly to be removably received in a toasting slot of an electric pop-up toaster facilitates inserting and removing food articles in the toasting slot for toasting of the food article. The removable toaster basket assembly includes an elongate substantially planar frame for resting on an upper surface of the toaster and defines a rectangular slot therethrough. A handle extends from one end of the frame. An elongate basket is slidably received in the slot, the basket having ends and sides which define an open top for receiving a food article. A stop on the basket limits translation of the basket with respect to said frame to maintain the basket captive within the frame. However, the Rick reference merely discloses an accessory that could be used with the existing toaster and lacks to provide a solution to process other kinds of foods in the toaster.

Another related reference is U.S. Pat. No. 4,972,767 filed by Gordon K. Russell et al. discloses a toaster. The Gordon reference teaches an elevator for a toaster is disclosed which has a first portion for supporting one or more frankfurters generally side by side between an opposed pair of heating elements in the toaster. The elevator includes a second portion for supporting one or more buns one in each bun heating chamber each bun being adjacent to a single heating element. The frankfurters are heated on two sides where the buns are heated on only one side. The side by side orientation of the first portion is at right angles to an axis formed between two of the buns when the buns are supported in the bun heating chamber by the second portion. However, the Gordon reference provides a specially designed toaster especially for toasting frankfurters.

Other documents describing the closest subject matter provide for a number of more or less complicated features that fail to solve the problem in an efficient and economical way. None of these patents suggest the novel features of the present invention.

III. SUMMARY OF THE INVENTION

It is an object of the present invention to provide a toaster accessory for cooking hot dogs, sausages or the like.

It is another object of the invention to provide a toaster accessory, which permits an efficient use of heat generated within a toaster for cooking other kinds of foods such as hotdogs.

It is yet another object of the present invention to provide a toaster accessory comprising a base member, one or more rectangular box like frame disposed below the base member and one or more hollow cages having open ends disposed within each rectangular box like frame for receiving the hotdogs.

It is yet another object of the present invention to provide a toaster accessory adapted to use with existing toasters.

It is yet another object of the present invention to provide a toaster accessory made of disposable material.

It is yet another object of the invention to provide a toaster accessory, which is compact and easily used.

It is yet another object of the invention to provide a toaster accessory, which is relatively inexpensive to manufacture.

Further objects of the invention will be brought out in the following part of the specification, wherein detailed description is for the purpose of fully disclosing the invention without placing any limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 exemplarily illustrates an exploded view of a toaster accessory 10 and a toaster in an embodiment of the present invention. The toaster accessory 10 sized to fit within the conventional toaster is illustrated FIG. 2 exemplarily illustrates a perspective view of the toaster accessory 10 in an embodiment of the present invention. The toaster accessory 10 comprising a base member 14, one or more rectangular box like frame 16 disposed below the base member 14 and one or more hollow cages 22 for receiving the hotdogs is illustrated.

Figure 3:
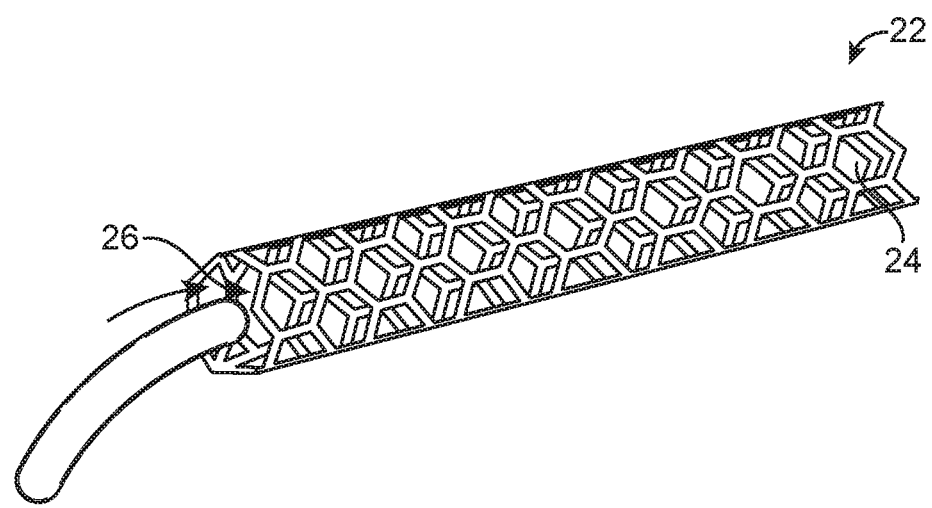

FIG. 3 exemplarily illustrates a perspective view the hollow cage 22 in an embodiment of the present invention. The hollow cage 22 receiving a hotdog via an open end 26 is illustrated.

V. DETAILED DESCRIPTION OF THE EMBODIMENTS OF THE INVENTION

Figure 2:
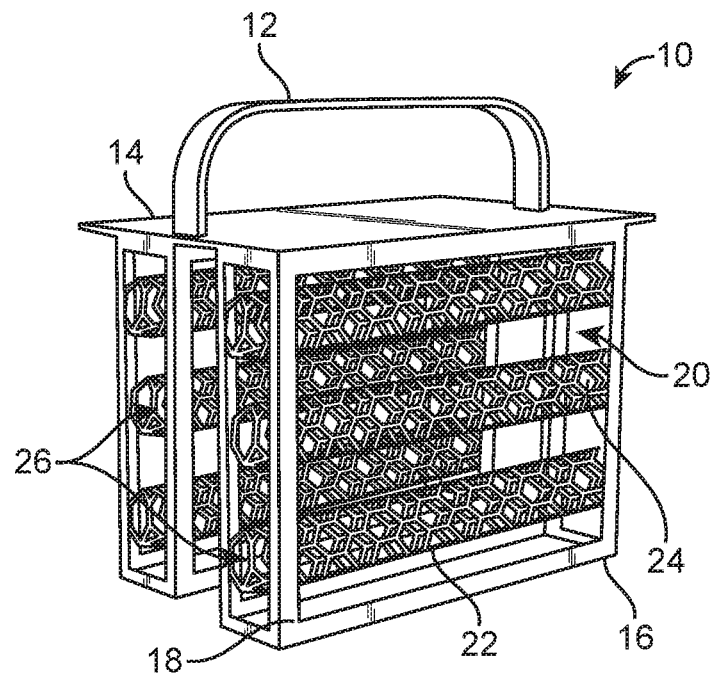

Referring now to the drawings, FIGS. 1-3, where the present invention is generally referred with numeral 10, it can be observed that a toaster accessory 10 adapted to be inserted into an existing conventional household toaster for the purpose of safely and efficiently toasting other food items such as hotdogs, sausages or the like in a toaster, is disclosed.

The toaster accessory 10 comprises a base member 14, one or more rectangular box like frame 16 and one or more hollow cages 22. The rectangular box like frame 16 is disposed below the base member 14 comprises multiple sidewalls 18 with rectangular opening 20. In one embodiment, the rectangular opening 20 extends throughout an area of the sidewall 18.

Further, one or more hollow cages 22 is disposed within each rectangular box like frame 16. In one embodiment, the hollow cage 22 is cylindrical in shape with open ends 26 to receive hotdog. In one embodiment, the rectangular box like frame 16 is sized to horizontally support the hollow cages 22. In another embodiment, the hollow cage 22 is formed of interconnected non-circular apertures 24. In yet another embodiment, the hollow cage 22 comprises a mesh type surface. In yet another embodiment, the toaster accessory 10 comprises slots or hangings to receive the hot dogs.

In one embodiment, the toaster accessory 10 further comprises a handle 12, which is disposed above the base member 14. In one embodiment, the handle 12 is attached to the centre of the top portion of the base member 14. In another embodiment, the handle 12 is made of heat resistant material. In another embodiment, the handle 12 is made of heat resistant polymer. In yet another embodiment, the handle 12 is made of metal member coated with a silicone rubber or heat resistant polymer. The handle 12 of the present invention prevents the user from burns, cuts and scratches when the toaster accessory 10 is inserted within the slot of the toaster. In some embodiments, the toaster could be a pop-up toaster.

In one embodiment, the toaster accessory 10 is made of disposable material. In another embodiment, the toaster accessory 10 is made of tin, aluminium or other foil material, or other selected malleable, lightweight, heat conductive material that is of relatively low cost to allow for such disposability. In another embodiment, the toaster accessory 10 is made of at least one material including, but not limited to, stainless steel and metal. In yet another embodiment, the toaster accessory 10 is 9" in height and 5" in width. In yet another embodiment, the toaster accessory 10 is of square shape. In yet another embodiment, the material, shape and dimension of the toaster accessory 10 may vary based on the needs of the end user.

In use, one or more hot dogs are placed in the hollow cage 22 via the open ends 26. Thereafter, the toaster accessory 10 with the hotdogs in place is dropped into the openings of the toaster utilizing the handle 12. The base member 14 adapted to rest on an upper surface of the toaster. The toaster is then actuated in the usual manner and heat is generated therein to broil the hotdogs in the respective hollow cage 22 of the toaster accessory 10. Upon completion of one or more heating cycles, the toaster accessory 10 is removed from the toaster with completely cooked or broiled hotdogs. The cooked hotdog is then could be slid and removed via the open ends 26 of the hollow cage 22.

The toaster accessory 10 of this invention is designed for individuals and commercial users who desire the advantages of providing and serving heated and toasted hot dog and other buns over unheated and un-toasted buns. The toaster accessory 10 is designed to be very light and portable. The present invention is advantageous for people with less cooking knowledge, students and parents. Further, the present invention does not require additional cooking ingredients such as oil, or utensils for cooking hotdogs. Further, the present invention saves time and energy when cooking hot dogs, provides an easy and safe way to cook hot dogs in a toaster, eliminates waiting for water to boil or cooking oil to heat, contributes to more efficient and even cooking of hot dogs, features a convenient and easy to use design and provides a great gift for the holidays or other special occasions.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An accessory for cooking hotdogs in a toaster, comprising:
    a base member having a uniform flat rectangular shape;
    a first frame and a second frame located entirely beneath said base member, wherein said first frame and said second frame are positioned parallel to each other and extending along a length of said base member, said first frame and said second frame each having a rectangular structure defined by a front sidewall, a rear sidewall, lateral sidewalls, and a bottom end, wherein each of the front, rear and lateral sidewalls each include a rectangular opening revealing an interior portion of the first frame and the second frame, wherein said first frame and said second frame are separated by a spacing, and
    at least one cage nested within each of said first frame and said second frame, wherein said at least one cage has a cylindrical shape and is formed of a system of interconnected non-circular aperture members defining the cylindrical shape with a first open end and a second open end, wherein said at least one cage is positioned horizontally within said first frame and said second frame such that said at least one cage extends across the length of said base member, wherein said first open end faces the front sidewall, wherein said second open end faces the rear sidewall, said at least one cage adapted to hold a hotdog therein.

2. The accessory of claim 1, wherein the first frame and the second frame is sized to horizontally support said at least one cage.

3. The accessory of claim 1, further comprises a handle disposed above the base member.

4. The accessory of claim 3, wherein said handle is made of a heat resistant material.

5. The accessory of claim 3 wherein said handle is made of a heat resistant polymer.

6. The accessory of claim 3 wherein said handle is made of a metal member coated with a silicone rubber.

7. The accessory of claim 3 wherein said handle is a U-shaped handle extending exclusively along the top end of said base member.

8. The accessory of claim 1, wherein the toaster is a pop-up toaster.

9. The accessory of claim 1, is made of at least one of a disposable material, aluminium or steel.

10. A toaster accessory, consisting of:
    a) a toaster;
    b) a base member being a flat uniform rectangular structure having a length and a width, wherein said length is greater than said width, wherein said base member further includes a handle disposed entirely above said base member along a center portion, wherein said handle is a U-shaped member which arches across the length of said base member, wherein said handle is a metal member coated with a silicone rubber or heat resistant polymer;
    c) a first frame and a second frame located entirely beneath said base member, wherein said first frame and said second frame are positioned parallel to each other and extending along the length of said base member, said first frame and said second frame each having a rectangular structure defined by a front sidewall, a rear sidewall, lateral sidewalls, and a bottom end, wherein each of the front, rear and lateral sidewalls each include a rectangular opening revealing an interior portion of the first frame and the second frame, wherein said first frame and said second frame are separated by a spacing; and d) three cages nested within each of said first frame and said second frame, wherein each of said three cages have a cylindrical shape and is each formed of a system of interconnected non-circular aperture members defining the cylindrical shape with a first open end and a second open end, wherein said three cages are positioned horizontally within said first frame and said second frame and parallel to each other such that said three cages extend across the length of said base member, wherein said first open end faces the front sidewall, wherein said second open end faces the rear sidewall, wherein sides of the three cages are exposed along the lateral sidewalls of the first and second frame, wherein said first open end is adapted to receive a hotdog or a sausage, wherein said first frame and said second frame is slidable inserted within said toaster to cook said hot dog or sausage therein.

\* \* \* \* \*